Jan. 16, 1962 S. ALLAN 3,016,947
GAS SUPPLY AND DISTRIBUTION APPARATUS
Filed May 8, 1958 2 Sheets-Sheet 1
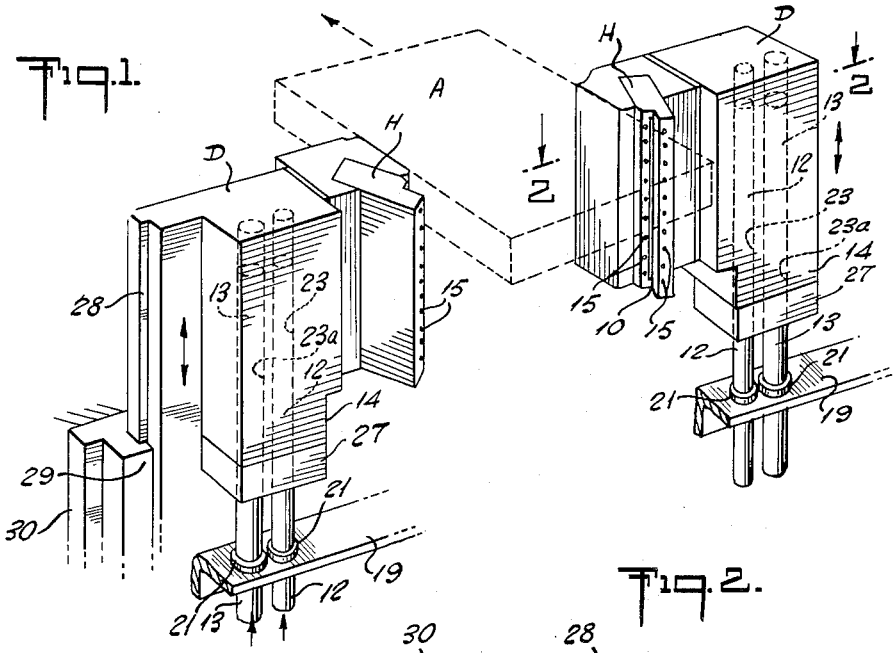
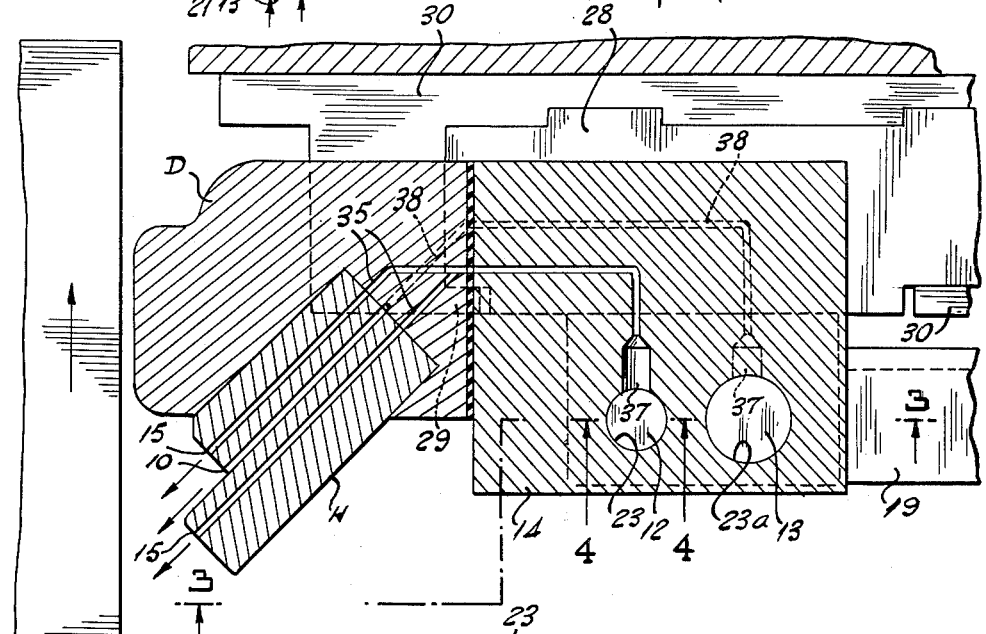
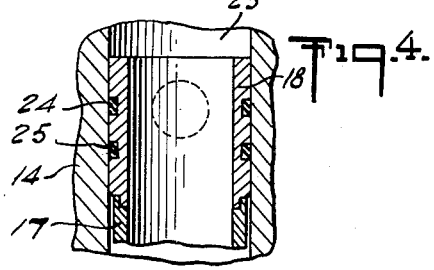
INVENTOR
STEWART ALLAN
BY
William F. Mosinger
ATTORNEY

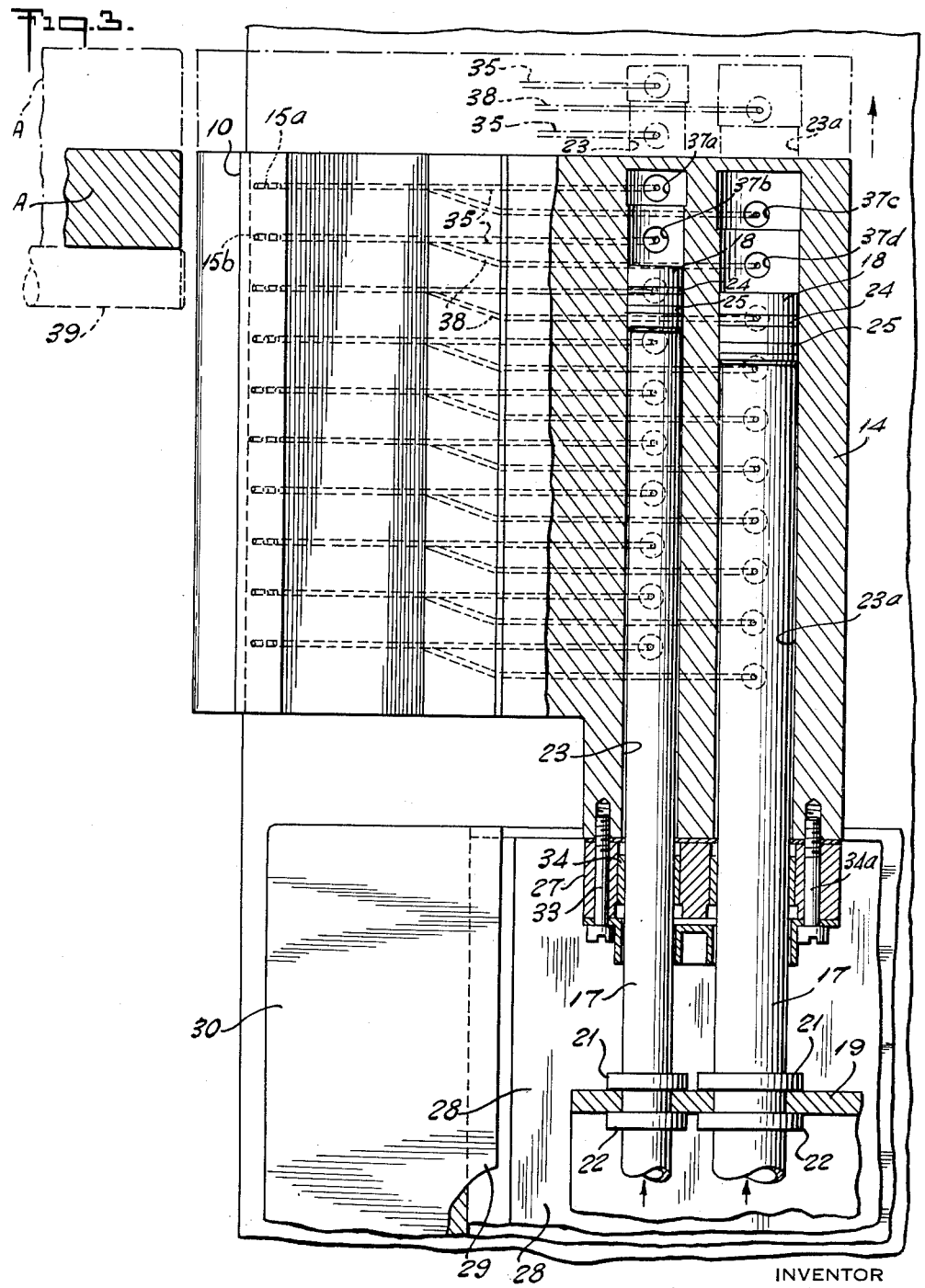

United States Patent Office 3,016,947
Patented Jan. 16, 1962

3,016,947
GAS SUPPLY AND DISTRIBUTION APPARATUS
Stewart Allan, Livingston, N.J., assignor to Union Carbide Corporation, a corporation of New York
Filed May 8, 1958, Ser. No. 733,861
4 Claims. (Cl. 158—27.4)

The present invention relates to an apparatus for thermochemically conditioning surfaces of metal bodies, and more particularly to a gas supply and distribution system for such apparatus.

In the manufacture of steel, the outer surfaces of hot billets or slabs are conditioned by a thermochemical treatment with cutting oxygen jets accompanied by high temperature pre-heat gas flames. This is accomplished by a desurfacing machine, the construction of which usually includes a large number of flexible conduits for bringing oxygen and fuel gas from suitable sources to the working area of the machine.

One of the major problems encountered in desurfacing machines is the maintenance and repair of flexible supply conduits which have become worn and damaged due to excessive flexing or contact with hot slag. The repair or replacement of such vital parts invariably requires the closing down of the machine and is generally considered an undesirable operation due to the loss sustained in both time and steel productivity.

It is therefore one object of this invention to reduce the number of such supply conduits and the consequent need for maintenance and repair thereof.

In desurfacing machines of the type mentioned, the desurfacing heads normally correspond in width to the largest surface to be treated, and include an adjusting means for accommodating surfaces of lesser width. To this end, a valving device is employed for supplying gas only to those jet orifices needed for treating the particular width of surface, the remaining orifices being cut off from the gas supply. The prescribed method of making such adjustment of desurfacing heads to accommodate a particular surface width involved rather complex equipment to feed the necessary gases to the desurfacing heads.

It is another object of the invention to incorporate an automatically adjustable gas selector with the gas supply and distribution system.

A further object is to provide a gas supply system capable of automatically proportioning the requisite amount of gases to the desurfacing head orifices in accordance with the width of surface to be treated.

According to the present invention, combustible gas and oxygen are supplied from a slideable gas manifold, to those individual passages defining the operative width of the desurfacing head. A pair of stationary hollow pistons co-operating with the slideable valve block provide a valving means whereby the supply of gas to individual passages is automatically controlled.

In the drawings:

FIG. 1 is an isometric view of an embodiment of the invention showing two desurfacing heads treating opposite sides of a metal body;

FIG. 2 is a sectional view taken along line 2—2 of FIG. 1;

FIG. 3 is a sectional view taken along line 3—3 of FIG. 2, and

FIG. 4 is a fragmentary sectional view taken along line 4—4 of FIG. 2.

With reference to the drawings, the invention is shown as being incorporated in a desurfacing machine capable of thermally conditioning both lateral surfaces of a moving slab A. This function is performed by means of preheat flames and cutting oxygen jets impinging on the slab from oppositely disposed desurfacing heads H incorporated in desurfacing assemblies D.

In the form shown, each desurfacing head has a wide continuous slot 10 for cutting oxygen and rows of preheat gas orifices 15 for fuel gas. The slot 10 is supplied by oxygen passages 38, and the orifices 15 are separately supplied with fuel gas by the passages 35. In operation, the assemblies are vertically adjusted, as indicated by the double pointed arrows, to accommodate varying thicknesses of slab.

Referring specifically to FIG. 1, the desurfacing assembly D comprises a pair of hollow gas piston rods 12 and 13, a slideably mounted gas valve block 14 co-operating therewith, and a pair of adjustable length gas chambers formed by parallel bores 23 and 23a within said manifold block.

To provide the greater volume of oxygen generally required for the scarfing operation, piston rod 13 for supplying oxygen, is slightly larger in diameter than piston rod 12 for supplying fuel gas such as acetylene.

The gas piston rods 12 and 13 are respectively connected at their lower extremities to a suitable gas regulating means. The pistons are supported stationarily with respect to the manifold by bracket 19 and are substantially parallel in order that the valve block 14 may freely slide thereon.

As shown in FIGS. 3 and 4, each piston rod 12 and 13 comprises an elongated piston tube 17, the upper end of which is provided with a sleeve or head 18, extending axially therefrom. The elongated tube 17 is fixedly positioned at its lower end to the bracket 19 which fastens to a horizontally moveable member 30 of the desurfacing machine. A hole in said bracket 19 receives said piston tube 17, allowing a slight clearance space thereabout.

A pair of circumferential rings 21 and 22, encircling the piston tubes, clamp the bracket 19 therebetween to effectively prevent vertical movement of said tubes within the bracket, yet allow a limited degree of horizontal motion to correct for misalignment of the various piston tubes with their mating valve block bores.

With reference to FIG. 4, the sleeve 18 fits closely within the valve block bore 23 and is slideably registered in gas sealed relationship by a pair of circumferential seal rings 24 and 25. The upper end of said bore is plugged, the other end constructed to slidably receive the sleeve 18. Each of said cylindrical bores is provided with a row of transversely disposed, equally spaced ports or openings 37, which communicate with the corresponding gas passages 38 and 35 to conduct oxygen and fuel gas respectively to the adjacent desurfacing head H and thence to the oxygen slot 10 and gas orifices 15.

Referring to FIGS. 1 and 3, the valve block 14 is provided on its under surface with a guide block 27 to be later described, it is also provided with means securing it to a vertically adjustable slide plate 28.

The slidably mounted plate 28 is retained within ways by over-reaching lips 29 affixed to the horizontal sliding member 30 which is controllably coupled to the desurfacer machine. The slide plate 28 may be propelled up or down as desired through suitable means as, for instance, by an air motor, such movement adapting the operating width of the heads H to treat slabs from about 2 inches to 14 inches in thickness.

The guide block 27, shown in FIG. 3, abuts the lower surface of the valve block 14, positioned by bolts 33 circumferentially spaced thereabout. The guide block 27 is provided with dual apertures for passing therethrough the respective oxygen and fuel gas pistons 13 and 12. Bronze sleeve guide bearings 34 and 34a, disposed in each of said apertures and in rubbing contact with said gas piston rods, provide a suitable guide bearing means.

Operation of the disclosed apparatus may best be illustrated with reference to FIG. 3 showing the slab A resting on a suitable powered roll table 39 with the adjacent desurfacing units positioned to condition one side thereof. As illustrated, pre-heating flames of ignited fuel gas will emerge from the outlets 15a and 15b which communicate with ports 37a and 37b by the interconnecting passages 35. In like manner, oxygen to the continuous slot 10 is supplied from ports 37c and 37d through the passages 38. In accordance with the invention, the spacing between adjacent preheat gas orifices 15a and 15b in the desurfacing head is approximately equivalent to the spacing between adjacent openings 37a and 37b. Similarly, the spacing between the ports in the desurfacing head which feed oxygen to slot 10, is approximately equal to the space between adjacent openings formed into the wall of the oxygen chamber for supplying the scarfing oxygen. With this predetermined lateral spacing, it may readily be seen that for any particular adjustment of the desurfacing head with relation to the treated metal surface there will be an equivalent longitudinal adjustment within the variable length gas chambers.

The means for controlling the degree of gas flow to the desurfacing unit resides in the relative disposition of pistons 12 and 13 within the respective gas chamber bores 23 and 23a. As the valve block slides upwardly and away from the piston, an increasing number of openings or ports 37 will become uncovered. Because of the sealing function of sleeve 18, the valve block chambers 23 and 23a are provided with gas only to the extent of that section of chamber forward of the sleeve. Oxygen and fuel gas will consequently enter those ports 37a, 37b, 37c and 37d which are exposed. As indicated in FIG. 3, for treatment of slab A, only ports 15a and 15b are provided with fuel gas and the corresponding section of the continuous slot 10 is supplied with oxygen.

Should the slab A have a greater thickness than shown in FIG. 3, such as illustrated by the broken line, valve block 14 and the desurfacing units may be adjusted to a corresponding height. In this adjusted position, the effective lengths of the gas chambers 23 and 23a are automatically increased, thereby uncovering an additional number of gas ports within said chambers. Each exposed port will then provide the required gas to its individual corresponding jet orifice 15, and the required amount of oxygen to the slot 10 in the operating width of the desurfacing head H.

The maximum height to which manifold 14 may be raised is limited by ports 37 within the gas chambers 23 and 23a. When the bottom most of such ports is positioned just beyond sleeve 18, an optimum flame coverage will be available at the desurfacing head.

Normally, in operation, as the valve block 14 is raised from its lowest position, an increasing length of gas piston rods 12 and 13 will become exposed to the surrounding atmosphere and subjected thereby to the splattering of surface slag and water being blown from the slab. To preclude damage to, or accumulation of, foreign matter on the said gas piston rod's outer surfaces, a protective means may be provided.

While foregoing drawings and description are limited to the use of a gas distribution system and apparatus for conditioning lateral surfaces of a steel slab, the invention is not intended to be so restricted. The construction is such that similar units might as readily be mounted to desurface the top and bottom surfaces of a slab or most preferably to treat all surfaces simultaneously.

What is claimed is:

1. In a desurfacing device for thermochemically treating a metal surface, a desurfacing head having a plurality of spaced discharge ports for arrangement transversely of said surface for directing heating flames and a high velocity flow of oxygen against said surface, said desurfacing head being movable transversely of said surface to bring to bear thereon a number of said discharge ports in accordance with the width of surface to be treated, a gas distribution apparatus for automatically and separately supplying oxygen and a fuel gas to said discharge ports in sufficient amount to thermochemically treat said surface, which apparatus includes: a valve block mounted for bodily movement with said movable desurfacing head, said block having a pair of open ended bores extending therethrough in a direction parallel to the movable direction of said head, a pair of stationary pistons having longitudinal gas passages therethrough, said pistons fixedly disposed in axial alignment with and slidably in said respective bores, the longitudinal gas passage in one of said pistons communicated with a source of oxygen, the longitudinal passage in the other of said pistons communicated with a source of fuel gas, the forward end of said pistons opening into said respective bores to provide flows of gas from the respective longitudinal passages, a plurality of openings arranged longitudinally along a wall of each of said bores, passages communicating each of said openings with at least one of said discharge ports in the desurfacing head, and means for slidably mounting said valve block and desurfacing head transversely of the surface to be treated whereby the number of openings exposed by said pistons is adjusted in conformance with the width of surface to be treated to provide a gas flow to those chamber openings positioned forward of said pistons.

2. In a desurfacing device for thermochemically treating a metal surface, said device having a movable desurfacing head adapted to slidably adjust in accordance with the width of surface to be treated, a plurality of spaced discharge ports positioned transversely of said head for directing heating flames and a high velocity flow of oxygen against said surface, a gas distribution apparatus for automatically and separately supplying oxygen and a fuel gas to said discharge ports in sufficient amount to thermochemically treat said surfaces, which apparatus includes: a valve block mounted for bodily movement with said movable desurfacing head, a pair of open ended cylindrical bores extending through said block in a direction parallel to the movable direction of said head, a pair of cylindrical stationary pistons having opposed upper and lower ends, said pistons fixedly spaced in substantial axial alignment with said respective open ended bores and axially slidable therewith, one of said cylindrical pistons communicated at the lower end thereof with a source of fuel gas, the other of said cylindrical pistons communicated with a source of oxygen, the forward end of said respective pistons adapted to slideably and gas tightly register in said respective open ended bores to define a pair of variable length gas chambers, resilient means surrounding the piston upper end affording a gas tight seal between said slideably registered piston upper end and said chamber wall, a plurality of openings longitudinally spaced along a wall of said gas chambers, passages communicating each of said openings with at least one of said discharge ports in the desurfacing head, and means for slideably moving said valve block and desurfacing head transversely of the metal surface to be treated whereby the length of said gas chamber will be automatically adjusted in conformance with the width of metal surface to be treated to provide a gas flow to those chamber openings positioned forward of said piston upper end.

3. A device substantially as described in claim 2 wherein the piston comprises an elongated cylindrical member, a sleeve extending axially from the forward end of said cylindrical member, said sleeve in registry with a bore in said valve block and having a diameter larger than the elongated cylindrical member a resilient seal ring surrounding said sleeve and radially compressed against the wall of said bore providing a slideable annular gas tight seal therewith.

4. A device substantially as described in claim 2 wherein the discharge head is provided with a plurality of equi-spaced discharge ports, the respective bores in said valve block are provided with a plurality of longitudinally equi-spaced openings extending along a wall thereof, the spacing between said respective discharge ports and said openings being substantially equal whereby adjustment of said valve block with respect to the surface to be treated will provide a flow of oxygen and fuel gas only to those equi-spaced openings positioned forward of the piston forward end.

References Cited in the file of this patent

UNITED STATES PATENTS

| | | |
|---|---|---|
| 1,015,164 | Fowden | Jan. 16, 1912 |
| 1,069,860 | Dale | Aug. 12, 1913 |
| 2,515,301 | Hughey | July 18, 1950 |
| 2,727,567 | Spies | Dec. 20, 1955 |